Jan. 7, 1964    C. E. TIRRELL    3,117,034
GAS ELECTRODE
Filed June 22, 1960
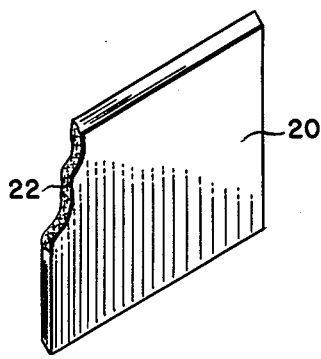
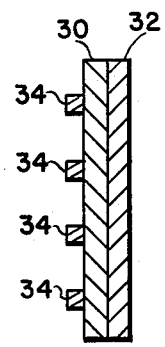
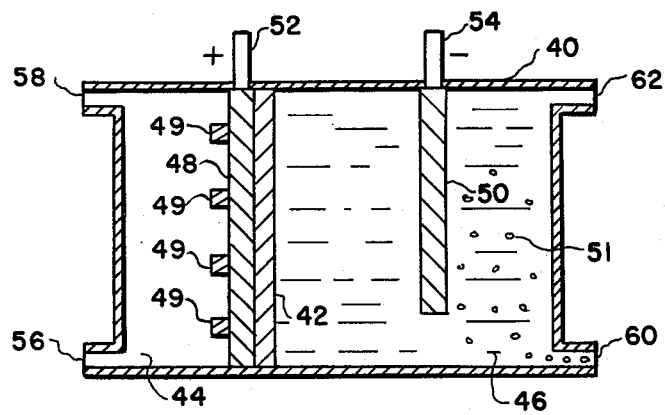
Inventor:
Charles E. Tirrell
by: [signature]
Attorney

United States Patent Office 3,117,034
Patented Jan. 7, 1964

3,117,034
GAS ELECTRODE
Charles E. Tirrell, Nahant, Mass., assignor to Ionics, Incorporated, Cambridge, Mass., a corporation of Massachusetts
Filed June 22, 1960, Ser. No. 37,960
6 Claims. (Cl. 136—86)

This invention relates to electrodes, and more particularly to electrodes for use in fuel cells as well as impressed-current electrolytic cells.

Fuel cells which produce electrical power from the consumption of a fuel and an oxidant in an electrochemical reaction are known in the art. One type of fuel cell employs a pair of electrodes separated from one another by an ion-permeable membrane and is known as a membrane fuel cell. In an exemplary cell of this type, hydrogen is employed as a fuel, and air or oxygen as an oxidant, the gases being fed respectively to substantially porous, catalyzing electrodes. The electrical balance of such a system is maintained, for instance, by the migration through the membrane of hydrogen ions formed at the appropriate electrode. A typical electrode usually has comprised a rigid electrically conductive structure which is microporous and therefore allows diffusion of the gas therethrough. The gas, being adsorbed on the surface of the interstitial pores of the electrode is dissociated into ions by a catalyst such as a noble metal. The ions are displaced from the surface of the catalyst by kinetic agitation and driven into and through the membrane, leaving a current producing electron for each ion formed.

In fuel cells of another type known as "Redox" cells, the electrode is employed to form a tri-phase boundary between an input gas and a fluid electrolyte. In fuel cells of another type, as for instance described in U.S. Patent No. 2,913,511, issued November 17, 1959, to W. P. Grubb, Jr., the electrode is in direct physical and electronic contact with an ion-permeable membrane, the latter constituting the sole electrolyte of the unit. Numerous examples are readily available of the many different known forms of catalyzing electrodes employed in sundry impressed-current electrolytic cells.

A number of different electrode structures have been suggested for use in the structures heretofore mentioned. For instance, one electrode in common use in fuel cells is formed from catalyzed microporous carbon, such as that described in Electrochemical Engineering, Fourth Edition, Mantell, McGraw-Hill, New York (1960).

Such electrodes are, if metallic in skeleton, expensive, often bulky, and usually rigid. In the latter case, when the electrode is employed in physical contact with the membrane of a membrane fuel cell, the membrane necessarily must attempt to conform to the electrode surface. This creates possibilities of discontinuity where the electrode's surface is irregular and thus impairs ion transfer. Consequently, a principal object of the present invention is to provide a novel, inexpensive, compact and readily replaceable electrode for use in membrane fuel cells. Another object is to provide an electrode which is sufficiently flexible to closely contact the surface of an ion-exchange membrane. Other objects of the invention are to provide, for use in both fuel cells and electrolytic cells, an electrode from which the valuable catalyst may readily be recovered following poisoning of the latter; and, to provide such an electrode which is relatively inert to corrosion from electrolytes and contaminants in gases supplied to the electrode. Yet other objects of the invention will in part be obvious and will in part appear hereinafter. The invention accordingly comprises the product and the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing in which FIGURE 1 shows a schematic, perspective view, partly broken-away and cross-section, of an electrode structure embodying the principles of the present invention;

FIGURE 2 shows one embodiment of an electrode assembly in cross-section of a membrane, an electrode, a catalyzed electrode, and a securing member for the entire assembly; and, FIGURE 3 shows a schematic view of a fuel cell employing the electrode of the present invention in conjunction with a membrane.

The present invention contemplates the production of an electrode for use, for instance, in a membrane fuel cell where the electrode has a porous, high surface structure containing a catalytic substance. In the preferred form such an electrode is formed by depositing the catalyst on a thin, sheet-like, macroporous substance which may be a non-conductor, the deposited catalyst rendering the product thereby both electrically conductive and catalyzing. Suitable electrode materials include as a skeleton, comparatively acid-inert, flexible materials, loosely formed of fiber, the materials being thermally stable to temperatures of approximately 500 degrees C., examples being asbestos cloth or "paper," aluminum-silica "paper" such as "Fiberfrax," manufactured by the Carborundum Company, and graphite woven cloth manufactured by National Carbon Company. The thickness of the electrode, while not critical, is preferably of an order small enough to allow the material to remain easily flexible and preferably is of the nature of 0.008 to 0.025 inch. As catalysts, metals such as platinum, iridium, rhodium and palladium, chosen from group VIII of the periodic table, are employable, particularly for hydrogen fuel electrodes, while metals such as silver are particularly appropriate for catalyzing oxygen gas supplied to a cathode. Adequate surface area is provided for the catalyst by the fibrous structure of the skeleton.

Referring now to the drawings, there is shown in FIGURE 1 one embodiment of the invention which comprises, in a preferred form, a sheet 20 of microporous asbestos such as a fiber mesh or cloth forming a carrier skeleton providing the physical strength and support for a catalyst shown at 22. The electrode includes graphite impregnated therein to form an electrically conductive network throughout the body of the electrode. One method of forming this structure is by slurrying coarse asbestos fiber with graphite, spreading the slurry to form a sheet and drying the sheet as by heat or vacuum treatment. Alternatively, the electrode is formed of a conducting cloth skeleton such as graphite fiber cloth, and therefore would only be catalyzed. In yet another embodiment, the catalytic metal is deposited within a skeleton of electrically non-conductive material, such as asbestos, and forms therein an electrically conductive, catalytic network. Such an electrode, because it is formed of pliable cloth-like material, provides a support which can be made very thin, is inexpensive, employs a small amount of catalyst, and is reproducible with remarkable uniformity. In the event of poisoning of this catalytic metal (for instance by cyanides, bisulfides, and sulfides, the electrode may be readily revivified without damage to the structure skeleton. This may be accomplished with reagents such as concentrated acids which would seriously corrode or even destroy many other types of electrode structures having metallic skeletons. Another method for revivifying the electrode is to flush in HCl and heat treat at about 600° C. An electrode of this kind is particularly suitable for use as a gaseous diffusion electrode in a fuel cell.

It should be noted that electrodes thus formed of a thin mesh or cloth of graphite (24 mesh of 1/64" fiber, for example) or graphite impregnated asbestos are characterized with remarkable pliability that allows optimum contact between the electrode and an ion-permeable membrane. It also allows the use of thin sheets of large dimensions (such as 18" x 40") which if formed of the usual rigid carbon would be too delicate for practical use requiring periodic replacement. Additionally, the use of such thin sheet structures permits the construction of cells considerably more compact than those known in the art.

Attempts have been made to form membranes directly upon the surface of conventional carbon electrodes with little success; the catalyzed carbon generally inhibits polymerization of the membrane. Where such structures have been made, it has been found that the combination of catalyzed electrode and membrane cannot be revivified by thermal methods without destroying the membrane. The structure of the electrode of this invention is clearly separable from the membrane for treatment after poisoning. A combination of membrane and electrode is shown in cross-section in FIGURE 2 wherein a catalyzed electrode 30, such as is shown and described in connection with FIGURE 1, is in intimate physical and electronic contact with an ion-permeable membrane 32, means such as grid-like member 34, being employed to retain the electrode against the membrane. Member 34 may be electrically non-conductive, or, in the preferred form is electrically conductive and therefore provides a terminal for leads to the electrode.

Referring now to FIGURE 3, there is shown an arrangement including an electrode and membrane combination, such as shown in FIGURE 2, used in a fuel cell. The latter comprises a substantially hollow container or casing 40 having disposed therein a cation-permeable membrane 42 in sheet form and so positioned transversely of the interior of the casing as to divide the latter into two separate chambers 44 and 46. Located within chambers 44 and 46, respectively, are a first electrode or anode 48 and a second electrode or cathode 50. In the embodiment shown, anode 48 is in intimate physical and electronic contact with the membrane over a major portion of the area of one surface of the latter being retained in this state by electrically conductive grid 49. The relative thicknesses of the electrodes and the membranes as shown in the figure have been exaggerated for the purpose of clarity in the description. The anode is preferably formed of an asbestos fiber cloth skeleton impregnated with graphite and catalyzed as hereinafter described while the cathode may be provided as a known electrode, or an appropriately catalyzed, macroporous, conductive asbestos electrode of the type described herein. The cathode, in the form shown, is in spaced relation to the membrane and is dimensioned to permit reasonably free circulation of a liquid catholyte 51 around the cathode and through the interspace between the cathode and the membrane. In the embodiment shown, the catholyte preferably is acid and includes an oxidant couple such as the bromine-bromide couple therein. Electrically conductive members, such as leads 52 and 54, are respectively connected to the anode and to the cathode to provide terminals from which electrical power generated by the cell may be drawn. Chamber 44 includes an inlet port 56 through which gas is supplied to the anode and an outlet port 58 through which impurities and incombustible materials injected into the chamber with the fuel gas, or inert reaction products, are exhausted.

In a similar manner, chamber 46 is provided with an inlet port 60 through which either an oxidizing gas such as oxygen, or an oxidized oxidant couple in solution is fed into the chamber. In the latter case, inlet 60 is employed for introducing an oxidant gas directly into the catholyte for regenerating reduced oxidant couple by oxidation of the latter. Chamber 46 also includes an outlet port 62 for venting waste gases such as carbon dioxide. Among the fuel gases suitable for use at the anode of the embodiment shown in FIGURE 3 are hydrogen, and hydrogen-containing gases such as water gas, reformed natural gas, producer gas, and the like.

The novel electrode may also easily be combined with a similar electrode or other electrodes known in the art to form an electrolytic cell for known electrolytic reactions such as oxidation-reduction reactions, chemical conversions, etc., through the action of impressed current.

*Example 1*

An electrode embodying the principles of the present invention was prepared in the following manner: A thin sheet of microporous asbestos paper was saturated in 20 percent aqueous solution of chlor-platinic acid ($H_2PtCl_6$) containing, as a reducing agent, hydroxylamine hydrochloride ($NH_2OH$—$HCl$) in the proportion of one gram per ten milliliters of solution. The paper was dried at a warm temperature and reduced thermally at 425° C. for one minute.

*Example 2*

A slurry of coarse asbestos powder and graphite powder in water was prepared and deposited uniformly on filter paper. The water was removed by vacuum pumping through the filter and dried with acetone. The resulting mat was then saturated and treated in the same manner as the paper described in Example 1.

*Example 3*

An electrode prepared according to Example 1 was employed as a fuel electrode in a cell of the type shown in FIGURE 3 wherein the oxidant couple in the aqueous catholyte was a bromine-bromide couple. The platinized abestos paper was held in intimate physical and electronic contact with the membrane by resilient means such as a mesh formed of platinum-coated titanium. The cell, when supplied with hydrogen at the anode and a mixture of oxygen and $NO_2$ catalyst bubbled through the catholyte, had an open circuit potential of 1.06 volts and an operating potential of 0.8 volt at 10 milliamperes per $cm.^2$, being approximately 0 with no hydrogen feed.

*Example 4*

An electrode embodying the principle of the present invention was prepared from iron-free, electrically insulating, microporous paper such as "Quinterra" asbestos paper, manufactured by Johns-Manville Company, having a thickness of 0.008 inch and saturated in a solution of concentrated ammonium hydroxide saturated with silver oxide. The paper was dried and reduced thermally at 400° C. to form metallic silver catalyst within the paper.

*Example 5*

A graphite cloth was impregnated with platinium by treating the cloth with 20% chloroplatinic acid containing hydroxylamine hydrochloride as a reducing agent and pt was reduced at 500° C.

The electrode was installed in a Fuelox cell as an anode. The cell had an open circuit potential of 1 volt and a potential of 0.65 volt at a current density of 40 ma./$cm.^2$.

Since certain changes may be made in the above product and apparatus without departing from the scope of the invention herein involved, it is intended that all matter contained in the above description or shown in the accompanying drawings shall be interpreted as illustrative and not in a limiting sense.

What is claimed is:

1. A fuel electrode assembly comprising, in combination, a flexible sheet-like, macroporous, non-metallic fiber support formed of relatively acid inert material, electrically conductive material contained therein, a catalytic metal distributed thereon, an ion-permeable membrane in physical and electronic face-to-face contact with said support, securing means for retaining said support in face-to-face contact with substantially the entire surface of said membrane.

2. A fuel electrode assembly as defined in claim 1 wherein said support is asbestos and the electrically conductive material is graphite impregnated therein.

3. A fuel electrode assembly as defined in claim 1 wherein the support is silica paper and the electrically conductive material is aluminum.

4. A fuel electrode assembly as defined in claim 1 wherein said electrically conductive material and the means for retaining said membrane comprises an electrically conductive grid element.

5. A fuel electrode assembly comprising, in combination, a macroporous graphite woven cloth, a catalytic metal distributed thereon, an ion-permeable membrane in physical and electronic face-to-face contact with the same, securing means for retaining said graphite cloth in face-to-face contact with substantially the entire surface of said membrane.

6. A gaseous fuel cell comprising an ion-selective permeable membrane, a gas permeable electrode, a second electrode, said membrane being positioned between said electrodes and secured in physical and electronic contact throughout the surface of said gas permeable electrode, aqueous electrolyte in contact with said second electrode and said membrane and including an oxidant couple therein, said gas permeable electrode being formed of an electrically non-conducting, relatively acid-inert material and including an electrically conductive, metallic catalyzing network disposed therein, means for supplying a fuel gas to said permeable electrode, and means for supplying a gaseous oxidant to said electrolyte for oxidizing reduced oxidant material.

References Cited in the file of this patent

UNITED STATES PATENTS

| 142,502 | Nolf | Sept. 2, 1873 |
| 1,784,592 | Heise et al. | Dec. 9, 1930 |
| 2,913,511 | Grubb | Nov. 17, 1959 |
| 2,924,634 | Fischback | Feb. 9, 1960 |
| 2,925,454 | Justi et al. | Feb. 16, 1960 |
| 2,925,455 | Eidensohn | Feb. 16, 1960 |

FOREIGN PATENTS

| 60,901 | France | Aug. 11, 1954 |
| | Addition to No. 1,078,903 | |
| 820,604 | Great Britain | Sept. 23, 1959 |
| 836,457 | Great Britain | June 1, 1960 |
| 874,633 | Great Britain | Aug. 10, 1961 |

OTHER REFERENCES

Status Report on Fuel Cells, U.S. Department of Commerce, Office of Technical Services, PB151804, page 20, June 1959.